United States Patent [19]

Wanlass

[11] 4,132,932
[45] Jan. 2, 1979

[54] BALANCED SPLIT-PHASE ELECTRIC MOTOR

[76] Inventor: Cravens L. Wanlass, 9871 Overhill Dr., Santa Ana, Calif. 92705

[21] Appl. No.: 859,282

[22] Filed: Dec. 12, 1977

Related U.S. Application Data

[63] Continuation-in-part of Ser. No. 597,529, Jul. 21, 1975, Pat. No. 4,063,135.

[51] Int. Cl.² .............................................. H02P 1/44
[52] U.S. Cl. .................................... 318/795; 318/817; 310/155; 310/190; 310/192; 310/193
[58] Field of Search ............... 318/200, 220 A, 221 R, 318/221 D, 222, 228; 310/155, 190–193, 216, 218, 254

[56] References Cited

U.S. PATENT DOCUMENTS

| | | | |
|---|---|---|---|
| 2,030,678 | 2/1936 | Bergman | 310/193 X |
| 2,094,512 | 9/1937 | Whitby | 318/221 D |
| 3,056,053 | 9/1962 | Fink | 310/190 X |

Primary Examiner—Gene Z. Rubinson
Attorney, Agent, or Firm—Lyon & Lyon

[57] ABSTRACT

A motor is disclosed in which the main stator winding of, for example, a squirrel case inducting motor, is connected in series with a capacitor so that the capacitor, together with the input voltage, causes the stator core to periodically switch from a nonsaturated to a saturated condition and vice-versa so that the flux density is maintained at a uniform high level. A second stator winding is provided in parallel with the first stator winding and capacitor which second winding serves as the phase winding and causes the motor to operate as a balanced split phase motor having a high efficiency over a broad range of operating points.

10 Claims, 2 Drawing Figures

BALANCED SPLIT-PHASE ELECTRIC MOTOR

RELATED APPLICATIONS

This is a continuation-in-part of my application Ser. No. 597,529, filed July 21, 1975, now U.S. Pat. No. 4,063,135, entitled "Electric Motor Having Controlled Magnetic Flux Density," the disclosure of which is incorporated by reference herein.

BACKGROUND OF THE INVENTION

One commonly used type of AC motor is the split phase capacitance motor. In this type of motor, one of the stator windings, normally the winding having more turns and greater inductance, is connected in series with a run capacitor to create a phase shift with the main stator winding. Such a motor can be more efficient than a simple capacitor start induction run motor because it operates as a two phase motor and has a true rotating field. However, the efficiency of such a motor is optimum only when it is operating in a balanced condition, i.e., when the energy transferred to the rotor through the capacitively coupled winding equals the energy transferred to the rotor through the inductively coupled winding. Unfortunately, this balanced condition is sensitive to many factors such as changes in load or line voltage, and any deviation from the balanced condition results in a substantial drop in efficiency. These changes have their major impact on the capacitively coupled winding; their impact on the inductively coupled winding is significantly less and the energy transferred by the inductively coupled winding remains reasonably constant. Although these motors operate with good efficiency at the rated load point, in practical field conditions they often differ from rated conditions, and as a result the theoretical efficiency is not obtained.

SUMMARY OF THE INVENTION

The present invention overcomes or reduces many disadvantages of conventional electric motors by providing a hybrid motor which employs a combination of a conventionally coupled inductive winding and a capacitively coupled winding of the type described in my above identified application. The motor system described in that application is designed to maintain the flux density in the stator at a maximum level. In addition, that system also permits the current in the rotor to be maintained at a large magnitude relative to those normally permitted in conventional electric motors of the induction type. Since the force generated in a conductor is defined by the equation:

$$F = BlI$$

where F = force
where B = flux density
where l = length of the conductor
where I = current in the conductor it can be seen that maximizing the terms B and I for a given l maximizes the force and consequently the torque and horsepower of a motor.

In the system disclosed in my copending application, the flux density is maximized by controlling the flux density in the stator core by means of a capacitor coupled in series with the main stator winding, the capacitor having a value such that the voltage stored therein will, in combination with the input voltage, periodically cause the volt-second capacity of the stator core to be exceeded with the result that the core will periodically change non-linearly from a non-saturated to a saturated condition and back again. The average flux density in the stator core can thus be maintained quite high without the danger of high input voltages resulting in extremely high input currents. The capacitor limits the amount of energy that can be transferred to the rotor even if the rotor has a very low impedance so rotor current can also be maximized. The rotor inductance and resistance can be made lower than in a conventional motor and the current induced at a given motor speed can be made greater than is conventional, if desired.

By using a capacitor in series with the motor stator winding and operating the motor magnetic path in soft saturation due to the limiting effect of total energy transfer of the capacitor, the end result is a motor that can be operated at maximum flux density under most conditions of line voltage without resulting in extremely high input currents for high input voltages. In other words, the input current and flux density in the device would not be extremely non-linear as a function of the line voltage as is presently the case with conventional AC induction, and other motors. The motor makes use of the fact that the inductances of the motor winding can only absorb so much energy before the magnetic material of the motor stator changes permeability and causes the capacitor to discharge. When the motor magnetic material saturates, the capacitor discharges through the motor winding and the power line source and charges up the capacitor in the opposite polarity. The current through the winding then reverses and the capacitor is then the source of energy and maintains the current flowing through the winding. This continues until the voltage of the input line changes in polarity. The volt-seconds of the input voltage from the line then adds to the volt-seconds that have been applied by the capacitor to the motor winding. This continues until the total volt-seconds applied to the motor winding exceeds the volt-second capacity of the winding and magnetic material of the motor stator, and then the magnetic material of the motor again saturates. The capacitor then discharges through the motor winding since it has saturated and the line power source charges up the capacitor in the opposite polarity again. The current then reverses once more through the motor winding and the capacitor again provides the source of current through the motor winding. This continues until the line voltage again changes polarity. As the line voltage amplitude continues to increase the volt-second of the line voltage plus that of the capacitor again are in phase and add until the volt-second capacity of the motor winding and its associated magnetic material are exceeded. The winding magnetic material again saturates and the inductance of the motor winding decreases considerably again causing the capacitor to discharge through the winding. This process is repeated each half-cycle and results in the motor being capable of running at maximum flux density and thus maximum force, torque and horsepower.

The use of that system allows for maximum flux density and since the voltage across the capacitor is usually much higher (although it need not be) than the line voltage, the flux density in the stator core is relatively independent of the line voltage over fairly wide ranges of amplitude. Furthermore, the capacitor prevents excessive currents from passing through the motor winding when the magnetic material saturates since only the energy in the capacitor, i.e., $\frac{1}{2}CV^2$, can be transferred through the winding. This limited energy transfer prevents excessive currents from the line going through the motor winding.

The result is an AC motor that will operate over wide ranges of input voltage and operate at high efficiency and possess excellent operating characteristics. Since the capacitor limits the amount of energy transferred through the motor winding each half-cycle, motor burn out is not as critical as in a standard motor.

As disclosed in my copending application, it was found that even better operating characteristics can be achieved if an auxiliary winding is provided on the stator core, this auxiliary winding being connected in parallel with the main winding and capacitor. It was found that the auxiliary winding provides the necessary rotating field for starting a single phase motor and in addition provides the necessary starting torque for the motor. It was further found that once the motor is up to rated speed at rated load, the auxiliary winding plays no appreciable part in the operation of the motor. If, however, the load increases, the auxiliary winding once again draws current, acts as a motor winding, and provides additional torque to the motor. In the event of a substantial overload, the motor will still stall but as soon as the load is removed the motor will again come up to speed. This auxiliary winding is usually much greater in impedance than the main winding and therefore the current through the auxiliary winding is relatively low compared, for example, with the main winding of an induction motor.

Furthermore, the auxiliary winding serves to limit the input current, because as the input voltage increases, or the motor speed increases, this winding begins to act as a generator winding due to the back e.m.f. exceeding the input voltage, and generates a control magnetic flux in the stator and a current which counteracts some of the current drawn by the main winding. This, of course, is made possible by the fact that the main winding is the primary source of power to the motor.

While the motor described in my copending application has been found to be extremely satisfactory in operation, I have discovered that in some instances it is preferable to design the motor so that the second stator winding, or auxiliary winding, acts to transfer energy to the rotor throughout the operating cycle of the motor in a balanced relationship with the main, capacitively coupled stator winding. Although such operation in some cases reduces somewhat the efficiency of operation that could otherwise be obtained by essentially using only the capacitively coupled winding to transfer energy, this loss is more than offset by the increase in efficiency obtained by having two phase operation with its true rotating field.

This balanced, two phase operation is obtained by placing constrictions in the pole pieces or teeth of the stator magnetic material so that these constricted teeth, rather than the back or return magnetic material of the stator, limit the maximum flux density that can be generated by the capacitively coupled winding. By so establishing a condition such that the flux density in the air gap generated by the capacitively coupled winding is maintained constant over a wide range of operating conditions, the energy transferred by this winding can be kept relatively constant, and since the energy transferred by the inductively coupled winding is also relatively constant, balanced two phase operation occurs regardless of changes in load, line voltage, etc.

DESCRIPTION OF THE INVENTION

Figure 1:
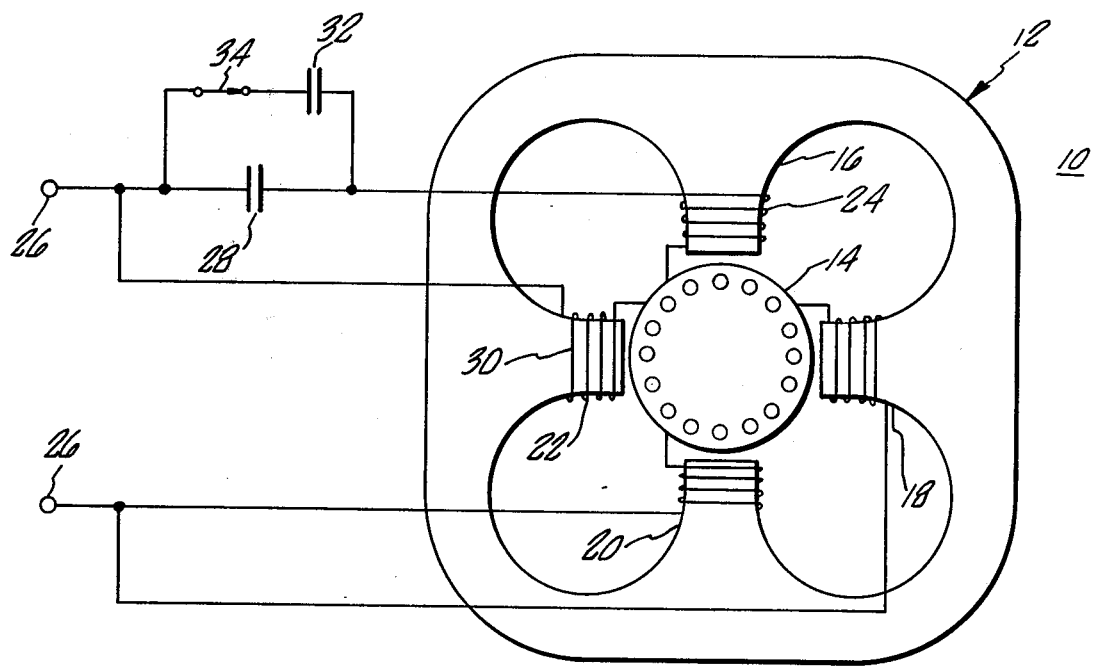
FIG. 1 is a schematic diagram of my basic motor without balanced split phase operation.

In FIG. 1, an AC induction motor of the squirrel cage type is generally indicated at 10 and is diagrammatically shown to have a stator 12 of magnetic material and a squirrel cage rotor 14. The stator is shown as having four pole pieces, 16, 18, 20 and 22 although more or less pole pieces may be used if desired, as will be apparent to those skilled in the art. It will also be apparent to those skilled in the art that the configuration of the pole pieces shown is diagrammatic only. No attempt is made herein to optimize the physical construction of the motor. The main stator winding 24 is shown as wound on poles 16 and 20 and is connected to input terminals 26 by means of a series capacitor 28. The capacitor 28 need have no particular value, but its capacitance must be large enough to maintain a capacitive power factor in the series circuit comprising this capacitor and the winding 24 during the motor's normal operating mode. An auxiliary winding 30 is wound on pole pieces 18 and 22 and is connected in parallel with winding 24 and capacitor 28. The winding 30 is preferably of considerably higher inductance and impedance than the winding 24. It may, for example, have considerably more turns of finer wire. A starting capacitor 32 is connected across the capacitor 28 by a centrifugal switch 34.

The operation of the motor shown in FIG. 1 is as described above. Briefly, when an AC voltage is applied to the terminals 26, the capacitor 28 begins to charge and a current flows through the winding 24. A current also flows through the winding 30 which is out of phase with the primarily capacitive current in the winding 24 with the result that a rotating field is created which causes the rotor 14 to begin rotating. At this time, a substantial amount of the driving force is produced by the winding 30 inasmuch as the main winding 24 and capacitor 28 has not yet entered into its normal operating mode. As the rotor speed and the back e.m.f. increase, the effective inductance of the winding 24 becomes such that this winding 24, together with the capacitor 28, goes into its operating mode. In other words, the effective volt-second capacity of the winding 24 and its associated magnetic material becomes sufficiently large to permit the operation of the device in the manner described previously, i.e., the capacitor 28 will periodically charge, discharge and recharge in the opposite direction causing the magnetic material associated with the winding 24 to switch from a nonsaturated to a saturated condition while maintaining the average flux density quite large.

As the rotor approaches rated speed, the current in the auxiliary winding 30 becomes less and less. Preferably, this winding is designed to have minimum current at rated speed and load and nominal input voltage. In the event the load should increase or the speed otherwise decrease, the winding 30 will draw more current and again contribute to the driving force of the motor. This is very desirable as it provdes additional torque for periods of overload, which overload, if the winding 30 was not present, might cause the capacitor 28 and winding 24 to be driven out of its operating mode and the motor to stall.

The capacitor 32, while not necessary, is helpful for increasing starting torque by initially allowing more current to flow through the main winding 24. After the motor reaches a predetermined speed, the centrifugal switch 34 opens, removing the capacitor 32 from the circuit.

Figure 2:
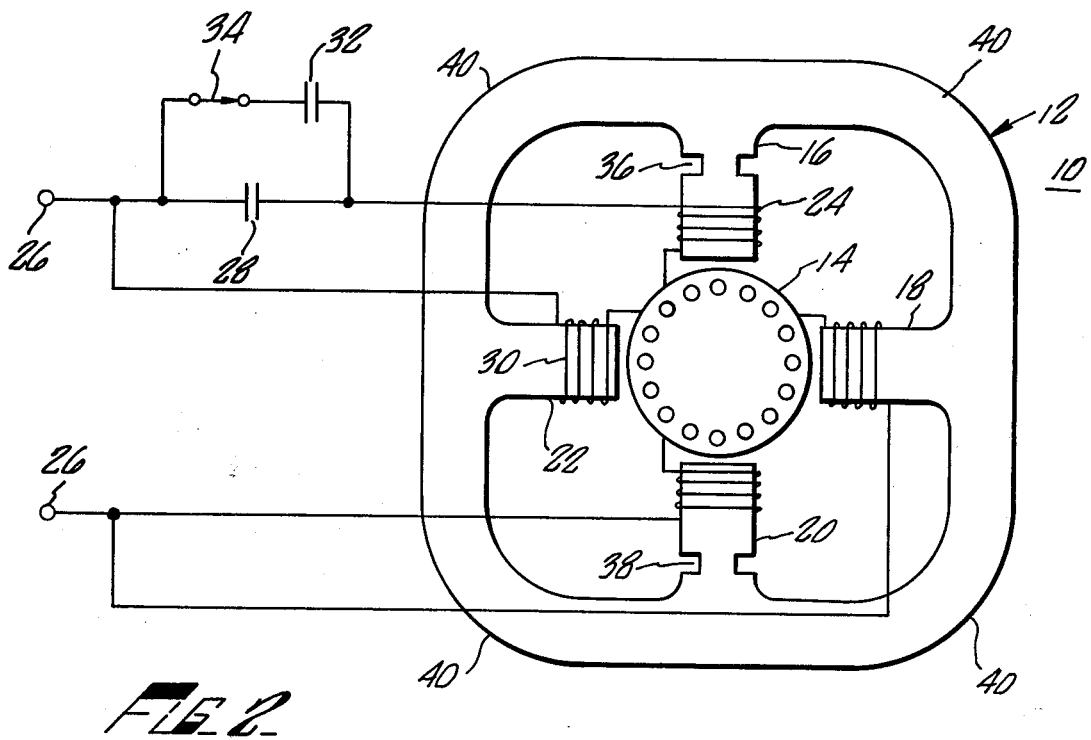
FIG. 2 is a schematic diagram of such a motor modified for balanced split phase operation.

FIG. 2 shows the motor of FIG. 1 modified for balanced split phase operation, the same reference numerals being used for the same elements. As can be seen, the pole pieces 16 and 20 are provided with constrictions 36 and 38, respectively. The back or return magnetic material 40 connects the pole pieces, 16, 18, 20 and 22. It should again be understood that the motor construction is shown in diagrammatic form only to foster easy understanding of the invention, and that no attempt has been made to depict a motor as it would most likely actually appear in practice. In practice, a typical motor often does not have pole pieces as such but rather a plurality of teeth defining slots in which the windings are positioned. It is the manner in which the windings are wound which determine where the poles lie. In such a case, the teeth making up that area of the stator core defining the poles associated with the capacitively coupled winding must be constricted. Accordingly, the terms "tooth" or "teeth" shall be used herein to mean that portion (or those portions) of the stator magnetic material that is associated only with one of the windings as distinguished from the return magnetic material associated with both of them. The plural is intended to include the singular and vice-versa. No particular construction of the core is necessary to the present invention, except that it is essential that the constricted pole pieces or teeth associated with the capacitively coupled winding, and not the return or back magnetic material, limit the flux density generated in the air gap by this winding, and that the return or back magnetic material be sufficient enough to prevent high flux density, i.e., at or near saturation, from occurring therein so that the inductively coupled winding operates normally. Thus, while constriction of the pole pieces or teeth is illustrated, any method of configuring them to accomplish the desired result of reducing their cross-sectional area could be used.

Energy is transferred to the rotor 14 by the winding 24 and capacitor 28 in the same manner as described in connection with the motor of FIG. 1. However, because the constrictions 36 and 38 control the volt-second capacity of the magnetic material encompassed by this series circuit, the flux density generated in the air gap by the winding 24 is also controlled by the constrictions. The capacitor 28 and winding 24 always provide enough energy to keep this portion of the motor operating in the controlled flux density mode. If the constrictions were not present, the volt-second interval would be determined by the interplay of the fluxes generated by both windings in the back iron and the winding 30 would contribute far less energy transfer than would the winding 24 during normal operation. As a consequence, the motor would not be operating as a balanced split phase motor and a true rotating field would not be present.

Because of the constrictions, however, the flux density generated by the winding 24 remains relatively constant. As previously noted, the density of the flux generated by the winding 30, now permitted by the ample return magnetic material available to it to operate as a conventional motor winding, also is relatively constant. The fluxes generated by the two windings are, of course, appropriately out of phase. Since the energy transferred by each winding is determined by the well known equation $F = BlI$, and since l and I are the same for both windings, keeping the flux densities relatively equal and constant means that the energy transferred to the rotor by each of the windings is relatively equal and balanced operation is obtained over a wide range of operating conditions.

It should be understood that while the foregoing description of the operation of the motor is believed to best describe the physical phenomena present in its operation, it is not meant in any way to limit the scope of the present invention, and that the operation of the motor may someday be better explained. It should also be understood that while the invention has been described in connection with a squirrel cage induction motor, it is not limited thereto. The foregoing description is thus meant to be illustrative only and not restrictive.

I claim:
1. An electric motor comprising:
   a stator core having magnetic material comprising teeth and return material joining said teeth;
   a first stator winding wound on said core and adapted to generate magnetic flux in some of said teeth and said return material;
   a second stator winding wound on said core and adapted to generate magnetic flux in others of said teeth and said return material;
   a rotor, an air gap between the stator and rotor;
   a capacitor;
   means connecting said capacitor and said first stator winding in series across said input and said second stator winding in parallel with the series connected first stator winding and capacitor; and
   the structural configuration of the teeth associated with said first stator winding being different from the structural configuration of the teeth associated with the second stator winding to cause the density of the magnetic flux generated in the air gap by said first stator winding to be more limited than the density of the magnetic flux generated in the air gap by said second stator winding.

2. The motor of claim 1 wherein the teeth associated with said first stator winding have a lesser cross-sectional area than the teeth associated with said second stator winding.

3. The motor of claim 2 wherein said teeth associated with said first stator winding are provided with constrictions while the teeth associated with said second stator winding are not.

4. The motor of claim 1 wherein the capacitance of said capacitor is large enough to maintain a capacitive power factor in said series circuit in the operating mode.

5. The motor of claim 4 wherein said capacitor is capable of being charged to a voltage sufficient, when added to said AC voltage, to develop a volt-second value across said teeth associated with said first stator winding greater than the volt-second capacity thereof so that said first stator winding teeth will be driven into saturation in opposite directions on each half-cycle of said AC voltage.

6. The motor of claim 5 wherein the teeth associated with said first stator winding have a lesser cross-sectional area than the teeth associated with said second stator winding.

7. The motor of claim 6 wherein said teeth associated with said first stator winding are provided with constrictions while the teeth associated with said second stator winding are not.

8. The motor of claim 5 wherein said second winding has a higher inductance than said first winding.

9. The motor of claim 6 wherein said second winding has a higher inductance than said first winding.

10. The motor of claim 1 wherein said second winding has a higher inductance than said first winding.

* * * * *